US012669171B2

(12) United States Patent
Nakamura et al.

(10) Patent No.: US 12,669,171 B2
(45) Date of Patent: Jun. 30, 2026

(54) VEHICLE

(71) Applicant: KAWASAKI MOTORS, LTD., Hyogo (JP)

(72) Inventors: Yuki Nakamura, Akashi (JP); Shoya Yamamoto, Akashi (JP); Takahiro Jyouzaki, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 353 days.

(21) Appl. No.: 18/418,642

(22) Filed: Jan. 22, 2024

(65) Prior Publication Data

US 2024/0240708 A1     Jul. 18, 2024

Related U.S. Application Data

(63) Continuation-in-part of application No. 17/314,587, filed on May 7, 2021, now Pat. No. 11,919,587.

(51) Int. Cl.
*F16H 57/04* (2010.01)
*B60K 13/04* (2006.01)
*F16H 57/027* (2012.01)

(52) U.S. Cl.
CPC ......... *F16H 57/0416* (2013.01); *B60K 13/04* (2013.01); *F16H 57/027* (2013.01)

(58) Field of Classification Search
CPC .... F16H 57/0416; F16H 57/027; B60K 13/04
See application file for complete search history.

(56) References Cited

U.S. PATENT DOCUMENTS

| | | | |
|---|---|---|---|
| 3,820,327 A | 6/1974 | Henault | |
| 6,832,872 B2 | 12/2004 | Koelm et al. | |
| 7,059,071 B2 | 6/2006 | Hanafusa et al. | |
| 7,191,753 B2 | 3/2007 | Sagara et al. | |
| 8,037,958 B2 * | 10/2011 | McClendon | B60K 13/04 180/68.1 |
| 8,210,297 B2 * | 7/2012 | Kalisz | B60K 13/02 180/68.2 |
| 8,439,141 B2 * | 5/2013 | Bessho | F16H 57/0416 180/339 |
| 10,124,659 B2 | 11/2018 | Bessho et al. | |

(Continued)

FOREIGN PATENT DOCUMENTS

| | | |
|---|---|---|
| CN | 104564327 | 4/2015 |
| CN | 1045664327 | 4/2015 |

(Continued)

OTHER PUBLICATIONS

Office Action issued Feb. 6, 2026 in U.S. Appl. No. 18/233,396.
Office Action issued Jan. 23, 2026 in U.S. Appl. No. 18/418,778.
Office Action issued Dec. 2, 2024 in U.S. Appl. No. 17/693,739.

*Primary Examiner* — Jacob B Meyer
(74) *Attorney, Agent, or Firm* — XSENSUS LLP

(57) ABSTRACT

A vehicle including an engine, an air-cooled CVT to which driving force output from the engine is input, a transmission to which the driving force from the engine is transmitted via the CVT, an exhaust pipe connected to the engine and adjacent to the transmission at an interval in a horizontal direction, and a CVT exhaust duct connected to the CVT and including a discharge port through which air inside the CVT is discharged, the discharge port being directed to a space between the transmission and the exhaust pipe.

9 Claims, 9 Drawing Sheets

(56)　　　　　　References Cited

U.S. PATENT DOCUMENTS

| | | | |
|---|---|---|---|
| 10,704,438 B2 | 7/2020 | Swab | |
| 10,920,639 B2 | 2/2021 | Kurasawa et al. | |
| 11,434,981 B2 * | 9/2022 | Oyama | F16H 57/0416 |
| 11,919,587 B2 * | 3/2024 | Jyouzaki | B62D 33/02 |
| 2006/0011401 A1 | 1/2006 | Nakamura et al. | |
| 2007/0227793 A1 * | 10/2007 | Nozaki | F02M 35/02 |
| | | | 180/68.3 |
| 2010/0186395 A1 | 7/2010 | Yang et al. | |
| 2011/0099990 A1 | 5/2011 | Lang et al. | |
| 2011/0239636 A1 | 10/2011 | Brunet et al. | |
| 2015/0128578 A1 | 5/2015 | Helferich | |
| 2016/0332676 A1 | 11/2016 | Miller et al. | |
| 2020/0122560 A1 | 4/2020 | Ward et al. | |
| 2020/0208731 A1 | 7/2020 | Matsudo | |
| 2021/0062704 A1 | 3/2021 | Itoigawa | |
| 2022/0355877 A1 * | 11/2022 | Jyouzaki | B60K 17/00 |
| 2022/0356939 A1 * | 11/2022 | Shimatani | F16H 57/0417 |
| 2024/0157781 A1 * | 5/2024 | Shimatani | B62D 25/2018 |
| 2024/0239184 A1 | 7/2024 | Tokuda et al. | |
| 2024/0240708 A1 * | 7/2024 | Nakamura | B60K 13/04 |

FOREIGN PATENT DOCUMENTS

| | | |
|---|---|---|
| DE | 10 2004 009 376 | 9/2004 |
| WO | 2004/078571 | 9/2004 |
| WO | 2013/079523 | 6/2013 |
| WO | 2018/030110 | 2/2018 |
| WO | 2018/030302 | 2/2018 |

* cited by examiner

UPPER

FRONT

LEFT

RIGHT

REAR

LOWER

VEHICLE

BACKGROUND

Technical Field

The present disclosure relates to a vehicle.

Background Art

U.S. Pat. No. 8,439,141 B2 discloses a work vehicle including a belt continuously variable transmission (CVT). This belt continuously variable transmission includes an exhaust duct through which cooling air having cooled the inside is discharged. The exhaust duct is set such that a discharge direction of cooling air is blown from a direction orthogonal to an exhaust muffler.

SUMMARY

An engine room in which an engine is mounted easily accumulates heat, and a component in the engine room easily become high in temperature. In particular, since temperature of an exhaust pipe through which exhaust gas is discharged from the engine becomes high, temperature of an exhaust-pipe-around-component arranged around the exhaust pipe is likely to rise due to radiant heat from the exhaust pipe.

An object of the present disclosure is to provide a vehicle capable of reducing a temperature rise of the exhaust-pipe-around-component by using exhaust air discharged from a CVT.

The present disclosure provides a vehicle including:

an engine;

an air-cooled CVT to which driving force output from the engine is input;

a transmission to which the driving force from the engine is transmitted via the CVT;

an exhaust pipe connected to the engine and adjacent to the transmission at an interval in a horizontal direction; and a CVT exhaust duct connected to the CVT and including a discharge port through which air inside the CVT is discharged, the discharge port being directed to a space between the transmission and the exhaust pipe.

According to the present disclosure, exhaust air discharged from the CVT exhaust duct is supplied to the space between the transmission and the exhaust pipe. In this space, hot air having temperature increased due to radiant heat from the exhaust pipe is likely to accumulate, but ventilation is promoted by exhaust air from the CVT exhaust duct. Furthermore, exhaust air from the CVT exhaust duct attracts surrounding air of the exhaust air and causes an air flow that indirectly cools the transmission. Therefore, in a case where the transmission and the exhaust pipe are adjacent to each other, cooling performance of the transmission is easily ensured by use of exhaust air from the CVT exhaust duct.

BRIEF DESCRIPTION OF DRAWINGS

The foregoing and the other features of the present disclosure will become apparent from the following description and drawings of an illustrative embodiment of the disclosure in which.

DETAILED DESCRIPTION

First Embodiment

A vehicle 100 according to a first embodiment of the present disclosure will be described with reference to FIGS. 1 to 6. The vehicle 100 according to the present embodiment is a utility vehicle. In the description below, the front-rear direction, left-right direction, and vertical direction as seen from the driver will be referred to as the front-rear direction, left-right direction, and vertical direction of the vehicle 100 and each component.

Figure 1:
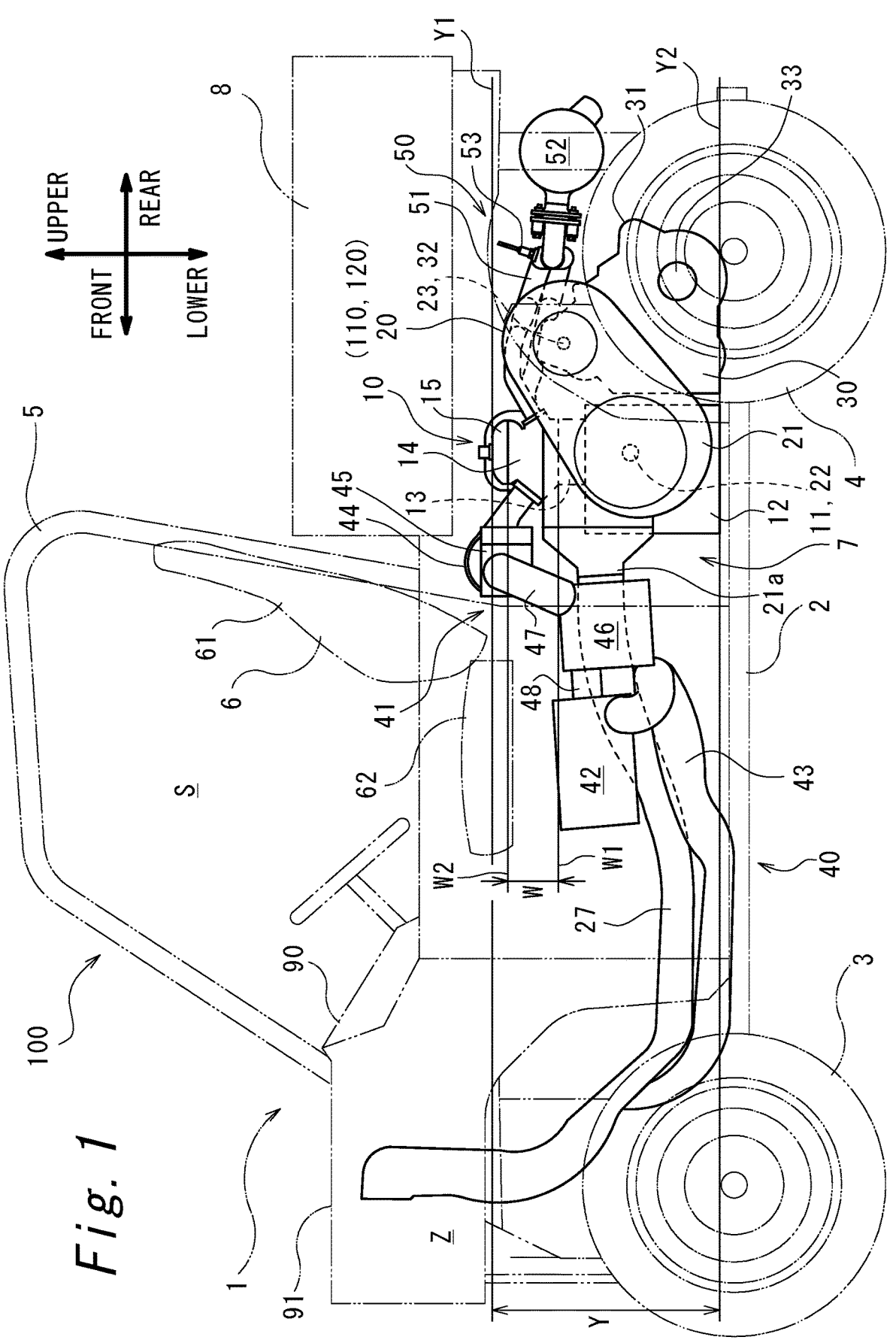
FIG. 1 is a left side view schematically illustrating a vehicle according to a first embodiment of the present disclosure.

FIG. 1 is a left side view of the vehicle 100. As shown in FIG. 1, the vehicle 100 has a vehicle body 1 and a powertrain mechanism 7 mounted on the vehicle body 1. Note that, in FIG. 1, the vehicle body 1 is shown by a chain double-dashed line, and the powertrain mechanism 7 is shown by a solid line.

The vehicle body 1 includes a vehicle body frame 2 that constitutes a framework. In the vehicle body 1, a pair of left and right front wheels 3 are disposed on both sides of the front portion of the vehicle body frame 2, and a pair of left and right rear wheels 4 are disposed on both sides of the rear portion of the vehicle body frame 2. Riding space S is located between the front wheel 3 and the rear wheel 4. The riding space S is surrounded by a ROPS (Rollover Protective Structure) 5.

A seat 6 is disposed in the riding space S. The seat 6 includes a driver's seat 6A located on the left side of the riding space S and a passenger seat 6B located on the right side of the riding space S (see FIG. 2). The vehicle body 1 is provided with a cargo bed 8 behind the seat 6. Below the cargo bed 8, an engine body 10, a CVT (Continuously Variable Transmission) 20, and a transmission 30 that constitute the powertrain mechanism 7 are disposed. The vehicle 100 is configured such that the rotational torque output from the engine body 10 is changed in rotation speed by the CVT 20 and the transmission 30 and transmitted to the front wheels 3 and the rear wheels 4.

Figure 2:
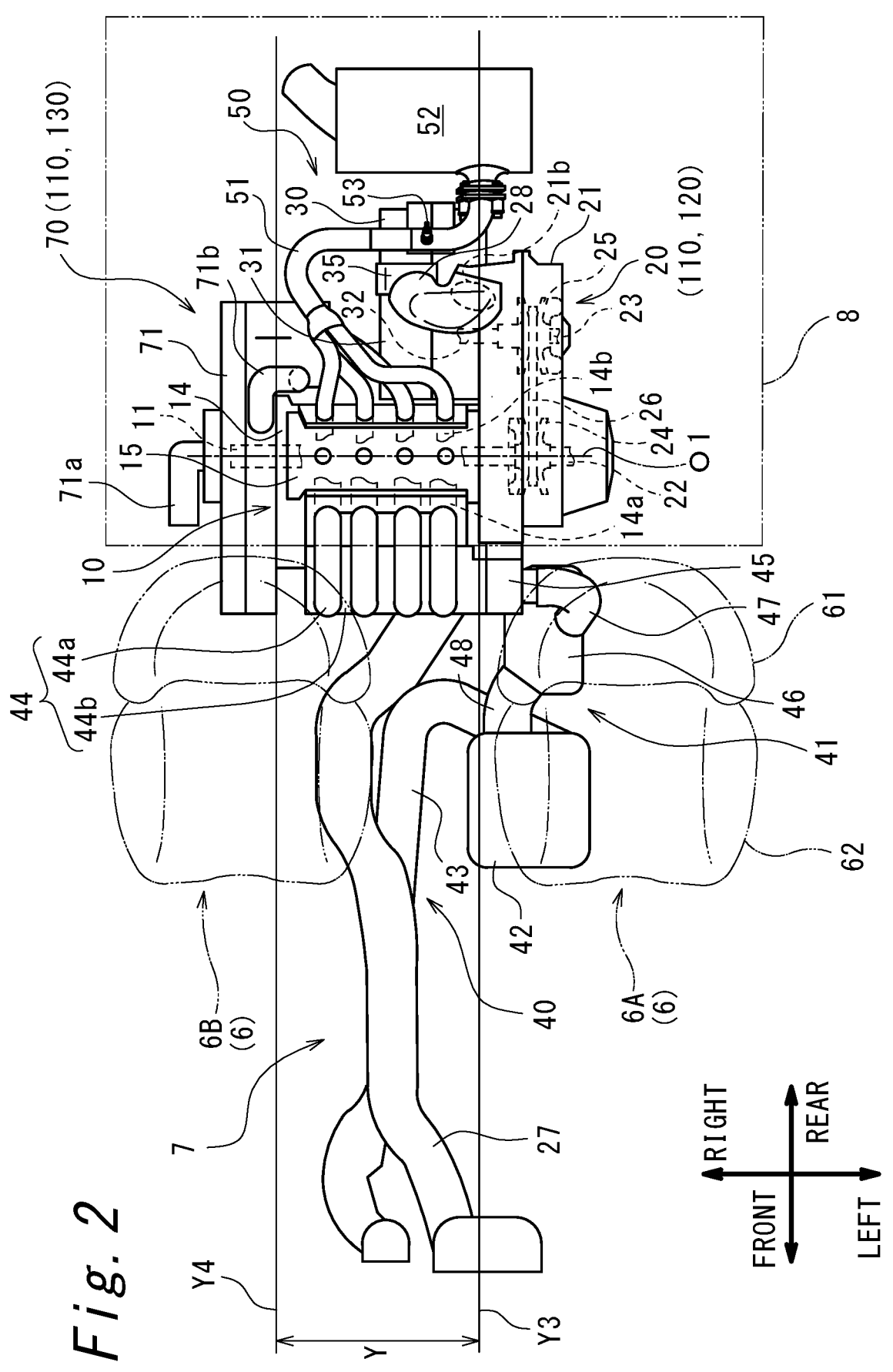
FIG. 2 is a top view schematically illustrating a powertrain mechanism.

Hereinafter, the powertrain mechanism 7 will be described. FIG. 2 is a top view of the powertrain mechanism 7. In FIG. 2, the seat 6 and the cargo bed 8 are both shown by a chain double-dashed line. With reference to FIG. 2 as well, the powertrain mechanism 7 further includes an intake system 40, an exhaust system 50, and an engine auxiliary unit 70 (see FIG. 6).

In the powertrain mechanisms 7, the CVT 20 and the engine auxiliary unit 70 constitute a power transmission unit 110 of the present disclosure in which the power is transmitted from the engine body 10. Further, the CVT 20 constitutes a driving force transmission unit 120 in which the power is transmitted from the engine body 10 as the driving force for traveling. Further, the engine auxiliary unit 70 constitutes an auxiliary transmission unit 130 in which the power from the engine body 10 is transmitted as a driving force for an engine auxiliary 71 attached to the engine body 10.

The engine body 10 has a crankshaft 11 as an output shaft from which rotational torque is output. In the present embodiment, the engine body 10 is a four-cycle in-line four cylinder engine in which a central axis O1 of the crankshaft 11 extends in the vehicle width direction. The engine body 10 has a crankcase 12, a cylinder 13, a cylinder head 14, and a cylinder head cover 15 in this order from the bottom.

The crankcase 12 rotatably supports the crankshaft 11. The cylinder 13 is coupled to the upper surface of the crankcase 12. The cylinder head 14 is coupled to the upper surface of the cylinder 13 and has four intake ports 14a on the front side and four exhaust ports 14b on the rear side. The cylinder head cover 15 is fixed to the upper surface of the cylinder head 14.

The CVT 20 (the power transmission unit 110 and the driving force transmission unit 120) is disposed adjacent to the left side of the engine body 10. The CVT 20 has a CVT housing 21 constituting an outer shell, and a CVT input shaft 22, a CVT output shaft 23, a drive pulley 24, a driven pulley 25, and an endless belt 26 accommodated inside the CVT housing 21.

The CVT input shaft 22 extends in the vehicle width direction and is connected to the crankshaft 11 so as to be able to transmit power. The CVT output shaft 23 extends in the vehicle width direction behind and above the CVT input shaft 22. The CVT 20 extends in a direction that is inclined upward toward the rear in a side view.

The drive pulley 24 is disposed on the CVT input shaft 22. The driven pulley 25 is disposed on the CVT output shaft 23. The endless belt (V belt) 26 is wound over between the drive pulley 24 and the driven pulley 25. In the CVT 20, the drive rotation inputted from the crankshaft 11 is transmitted to the CVT input shaft 22, has the speed changed through the drive pulley 24, the driven pulley 25, and the endless belt 26, and is output from the CVT output shaft 23.

The CVT housing 21 is provided with a CVT intake opening 21a in the front portion and a CVT exhaust opening 21b in the rear portion. The CVT intake opening 21a opens forward. The CVT exhaust opening 21b opens upward, more specifically, in a direction inclined forward and inward (right side) in the vehicle width direction toward the upper side. A CVT intake duct 27 is connected to the CVT intake opening 21a. A CVT exhaust duct 28 is connected to the CVT exhaust opening 21b, which protrudes toward the engine body 10 side (right side) in the vehicle width direction and exhausts rearward.

The CVT 20 is of an air-cooled type in which air is taken from the CVT intake opening 21a into the inside of the CVT housing 21 through the CVT intake duct 27, and the inside of the CVT housing 21 is cooled by the taken-in air. Next, the air that has cooled the inside of the CVT housing 21 is discharged from the CVT exhaust opening 21b to the outside of the CVT housing 21 through the CVT exhaust duct 28. For example, the drive pulley 24 may be provided with a fin so that a centrifugal fan is constituted, and the fin may be configured to take in air from the CVT intake opening 21a as the drive pulley 24 rotates.

The CVT intake duct 27 extends forward below the substantially center in the vehicle width direction of the seat

6 to reach a bonnet space Z located in front of the riding space S. In the present description, as shown in FIG. 1, the bonnet space Z is defined in the front-rear direction as a range that is in front of a dashboard 90 that delimits a front end of the riding space S and has the front end extending to a front end portion of the vehicle body 1, and is defined in the vertical direction as a range in which the upper end is a bonnet 91 and the lower end is the vehicle body frame 2 and a wheel house (not shown). The CVT intake duct 27 extends upward in the bonnet space Z and opens forward.

Figure 6:
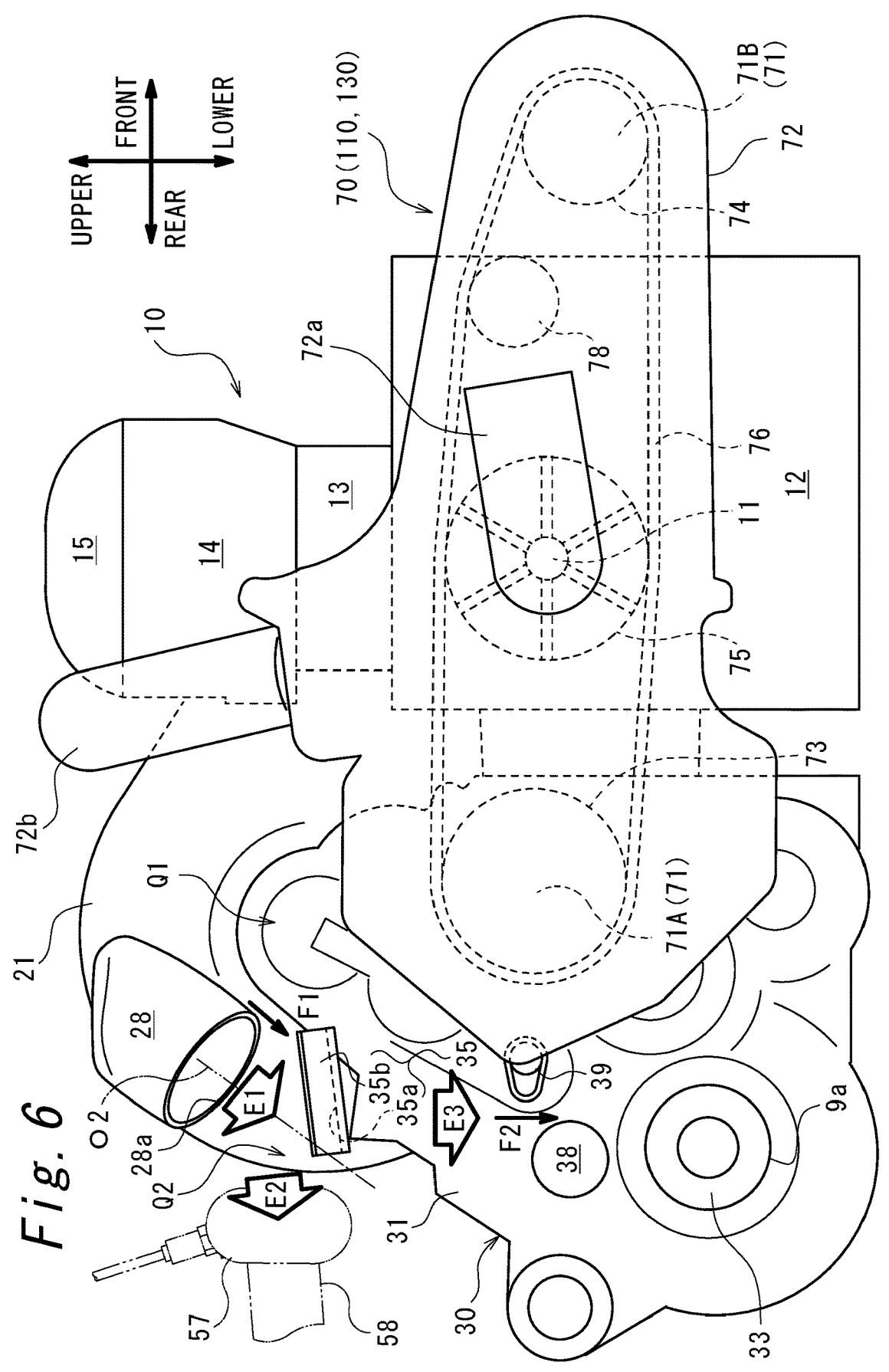
FIG. 6 is a right side view of the area around the engine body.

The CVT exhaust duct 28 projects from the CVT housing 21 in a direction to be closer to the engine body 10 in the vehicle width direction. Specifically, the CVT exhaust duct 28 curves and extends downward toward the inner side in the vehicle width direction, and opens in a direction inclined rearward and inward (right side) in the vehicle width direction toward the downward side above the transmission 30. As shown in FIG. 6, the CVT exhaust duct 28 is located below the upper end portion of the CVT housing 21.

As shown in FIGS. 1 and 2, the transmission 30 is located behind the engine body 10 and adjacent to the right side of the CVT 20. The transmission 30 includes a transmission housing 31 that constitutes an outer shell, and a transmission input shaft 32, a transmission output shaft 33, and a gear train (not shown) accommodated inside the transmission housing 31.

The transmission input shaft 32 extends in the vehicle width direction in an upper front portion of the transmission housing 31, and is connected to the CVT output shaft 23 so as to be able to transmit power. That is, the transmission input shaft 32 is located above and behind the crankshaft 11. The transmission output shaft 33 extends in the vehicle width direction in a lower rear portion of the transmission housing 31. That is, the transmission output shaft 33 is located below and behind the transmission input shaft 32. In the transmission 30, the drive rotation inputted from the CVT output shaft 23 is transmitted to the transmission input shaft 32, has the rotation speed changed through the gear train (not shown), and is outputted from the transmission output shaft 33.

Figure 3:
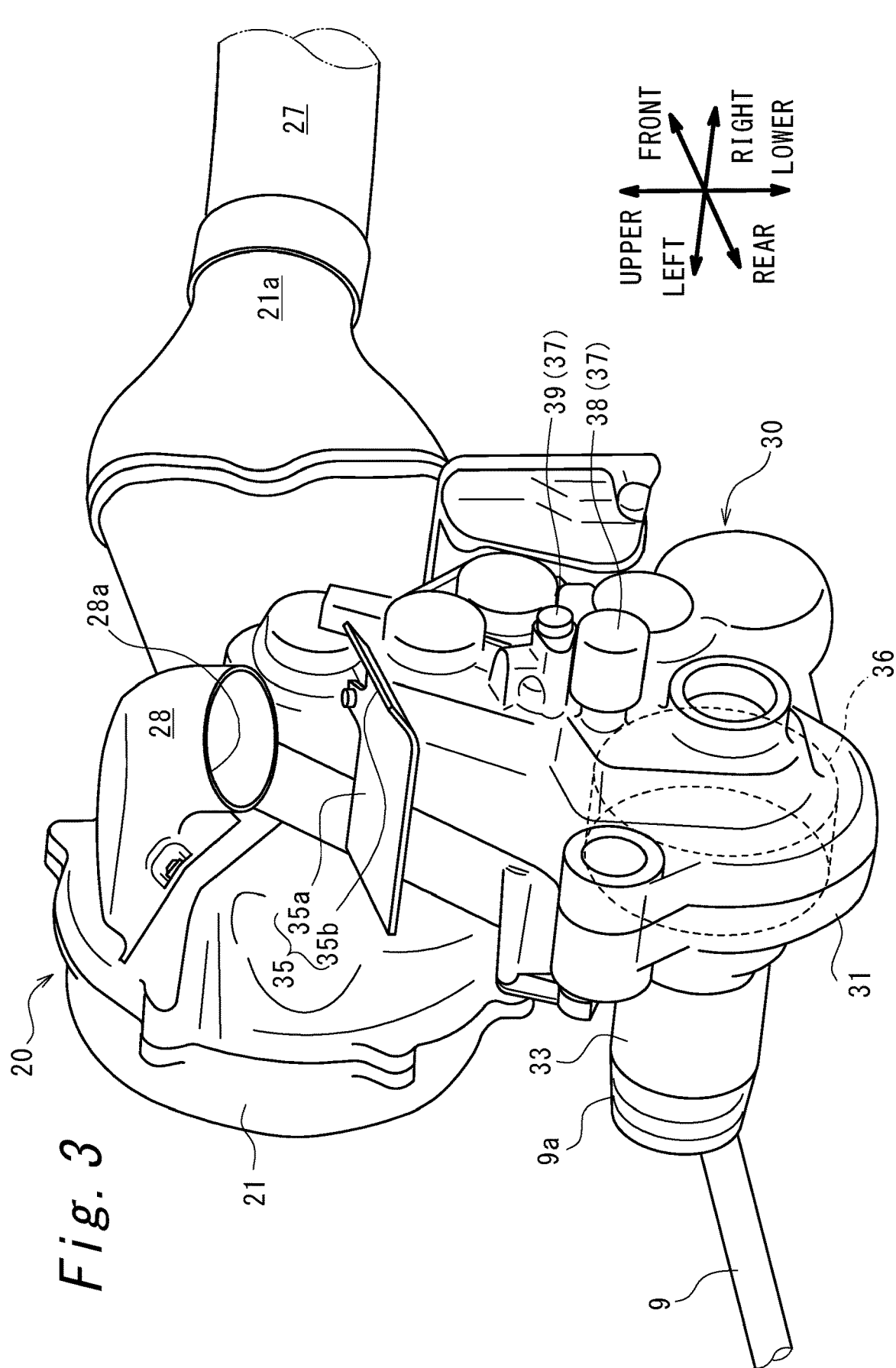
FIG. 3 is a perspective view of an area around a transmission as viewed from the rear.

FIG. 3 is a perspective view of an area around the transmission 30 as viewed from the rear and from the inner side in the vehicle width direction. As shown in FIG. 3, a drive shaft 9 for driving the rear wheel 4 is connected to the transmission output shaft 33. The drive shaft 9 includes a drive shaft boot 9a made from rubber at a portion connected to the transmission output shaft 33. An upper portion of the transmission housing 31 is inclined downward toward the rear.

The transmission 30 is provided on a right side surface with an electric component 37 that is electrically driven or executes predetermined detection. That is, at least a part of the electric component 37 faces a space defined between the transmission 30 and an exhaust pipe 51 arranged on the right side of the transmission 30. In the present embodiment, the electric component 37 includes a differential lock solenoid valve 38 and a rotation sensor 39. The differential lock solenoid valve 38 controls a differential device 36 provided in the transmission housing 31 to fix distribution of driving force to the left and right rear wheels 4 at 50:50. The rotation sensor 39 detects a rotation speed of the transmission output shaft 33.

The transmission 30 further includes a baffle plate 35. The baffle plate 35 is attached to an upper portion of the transmission housing 31. More specifically, the baffle plate 35 is arranged at a position below a discharge port 28a of the CVT exhaust duct 28 in the upper portion of the transmission housing 31, and is provided at a position at which the discharge port 28*a* of the CVT exhaust duct 28 faces the baffle plate 35 from above. The baffle plate 35 has a first surface portion 35*a* extending in a horizontal direction and a second surface portion 35*b* extending in a direction inclined upward toward the right side in a manner continuous with a right edge of the first surface portion 35*a*.

Figure 5:
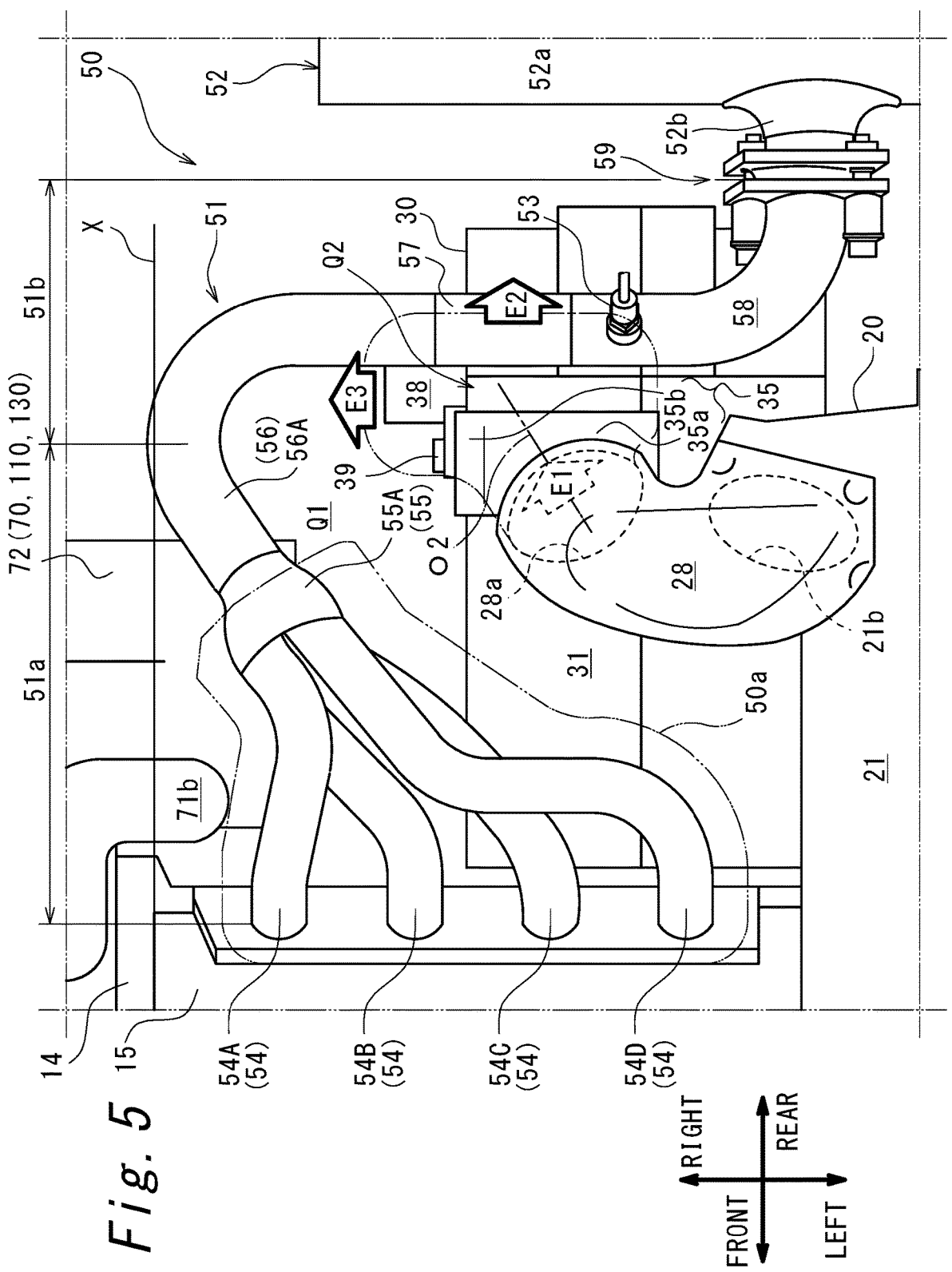
FIG. 5 is an enlarged view of the area around an exhaust pipe in FIG. 2.

As illustrated in FIG. 5, according to the baffle plate 35, first exhaust air E1 discharged downward from the CVT exhaust duct 28 to the rear side and the right side is to be received by the first surface portion 35*a* and divided at least into second exhaust air E2 guided rearward by the second surface portion 35*b* and third exhaust air E3 passing over the second surface portion 35*b* to the right side.

With reference to FIGS. 1 and 2, the intake system 40 has an intake pipe 41, an air cleaner 42, and an engine intake duct 43. The intake pipe 41 has an intake manifold 44, a throttle body 45, and an air box 46 in this order from the downstream side of the intake path.

The intake manifold 44 has, on the downstream side, four independent port portions 44*a* connected to the intake ports 14*a* of the cylinder head 14 and a collecting port portion 44*b* in which the upstream sides of the independent port portion 44*a* are integrated into one. The independent port portion 44*a* extends in a direction inclined downward toward the rear. The collecting port portion 44*b* extends in the left-right direction in an upstream side end portion (front end in the diagram) of the independent port portions 44*a*. The collecting port portion 44*b* has an entrance in a left end portion.

The throttle body 45 is connected to the left side of the intake manifold 44. Specifically, the throttle body 45 is connected to a left end portion of the collecting port portion 44*b* of the intake manifold 44. In the present embodiment, the throttle body 45 adjusts the amount of air flowing into the engine body 10 as the opening degree of a butterfly valve (not shown) is electronically controlled, and thereby the rotation speed of the engine body 10 (crankshaft 11) is controlled.

The air box 46 is disposed below the front of the throttle body 45 and below a seat back 61 of the driver's seat 6A. The air box 46 is connected to an upstream side end portion (left side in the diagram) of the throttle body 45 with an air pipe 47 interposed between them. The air box 46 acts as a resonator that reduces intake noise in the intake system 40 or a surge tank that suppresses a sudden fluctuation in the amount of air flowing into the engine body 10.

The air cleaner 42 is connected to the air box 46 with an air pipe 48 interposed between them. The air cleaner 42 is disposed below the seat 6 on the front side of the engine body 10 with space between them. Specifically, the air cleaner 42 is disposed below a seat cushion 62 of the driver's seat 6A. More specifically, the air cleaner 42, in top view, has at least the left half overlapping the seat cushion 62 of the driver's seat 6A.

As shown in FIG. 1, in the vertical direction, an upper end portion of the air cleaner 42 is located below an upper end portion of the cylinder head 14. Specifically, the upper end portion of the air cleaner 42 is located at substantially the same height as a straight line W1 that passes through a lower end portion of the cylinder head 14 and extends horizontally in the front-rear direction. Further, as illustrated in FIG. 2, in the left-right direction, the air cleaner 42 has a left end portion located further on the left side than the engine body 10 and further on the right side than a left end portion of the CVT 20, and a right end portion located further on the right side than a left end portion of the engine body 10.

With reference to FIG. 1 as well, a downstream side end portion of the engine intake duct 43 is connected to the lower rear end of the left side surface of the air cleaner 42. The engine intake duct 43 extends below the seat 6 to the right, curves forward below the substantial center in the vehicle width direction of the seat 6, and extends forward below the CVT intake duct 27 to reach the bonnet space Z. The front opening tip of the engine intake duct 43 extends upward and opens forward on the right side of the front opening tip of the CVT intake duct 27 in the bonnet space Z. However, the positional relationship between the opening tips is not limited to one in the present embodiment.

In the intake system 40, the intake air taken in through the engine intake duct 43 is filtered by the air cleaner 42 and then reaches the throttle body 45 via the air box 46. In the throttle body 45, the intake air is adjusted to the air flow rate according to the output required by the engine body 10 and reaches the intake manifold 44. In the intake manifold 44, the intake air is distributed from the collecting port portion 44*b* to the independent port portions 44*a* and introduced into the intake ports 14*a*.

Figure 4:
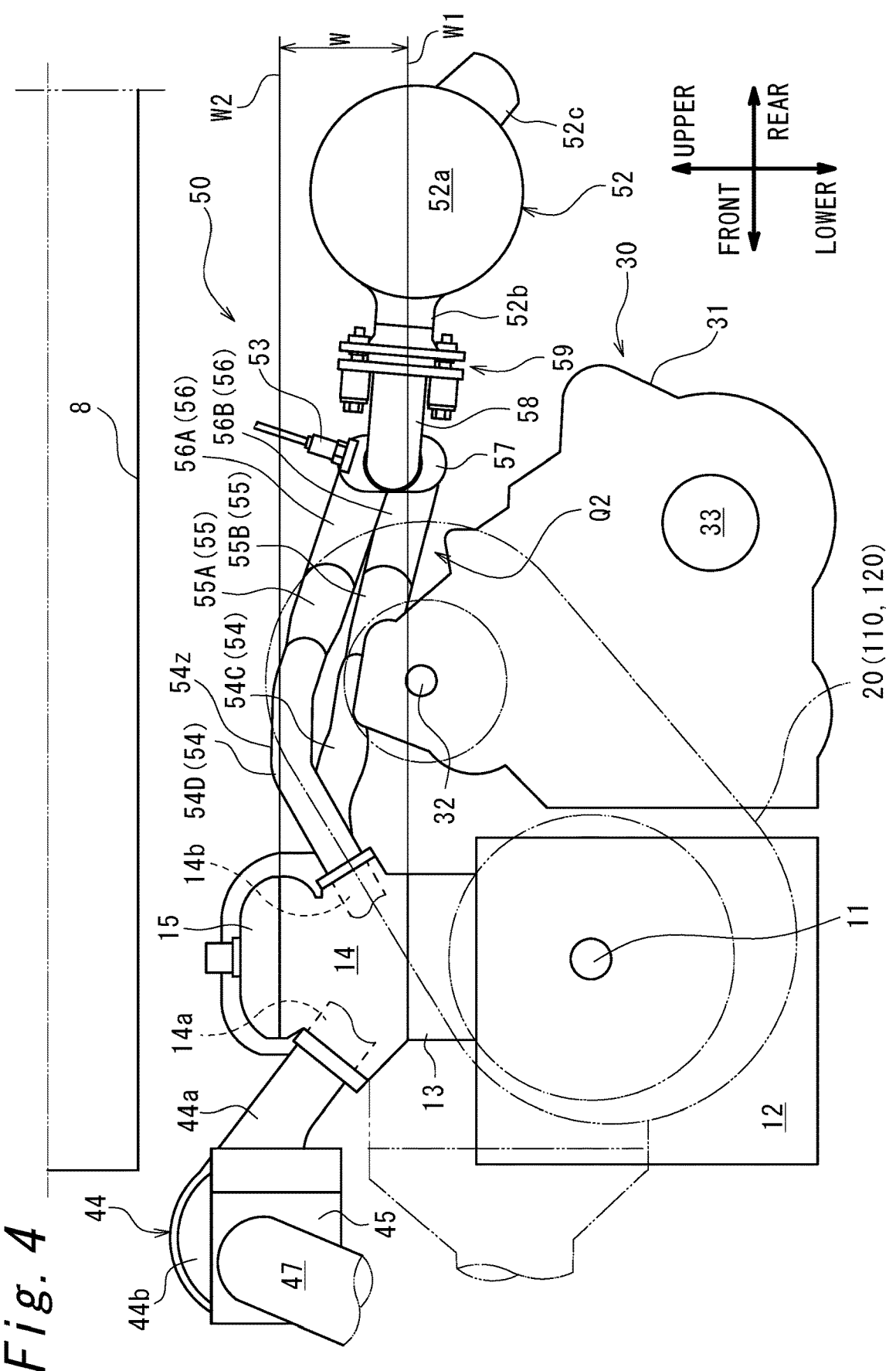
FIG. 4 is an enlarged view of the area around an engine body in FIG. 1.

FIG. 4 is a right side view illustrating an area around the exhaust system 50 in the powertrain mechanism 7. Note that, in FIG. 4, the CVT 20 is shown by a chain double-dashed line. FIG. 5 is a top view illustrating an area around an exhaust pipe 51 in an enlarged manner in the powertrain mechanism 7. As shown in FIGS. 4 and 5, the exhaust system 50 includes the exhaust pipe 51, an exhaust muffler 52, and an exhaust gas sensor 53. The exhaust pipe 51 has four independent exhaust pipes 54, two first collecting pipes 55, two first exhaust pipes 56, one second collecting pipe 57, and one second exhaust pipe 58 in this order from the upstream side.

The four independent exhaust pipes 54 are connected to the four exhaust ports 14*b* of the cylinder head 14. The four independent exhaust pipes 54 are composed of a first independent exhaust pipe 54A, a second independent exhaust pipe 54B, a third independent exhaust pipe 54C, and a fourth independent exhaust pipe 54D arranged in this order from the right side. The fourth independent exhaust pipe 54D is connected to the exhaust port 14*b* (CVT side exhaust port) located on the side closest to the CVT 20 among the four exhaust ports 14*b*, and constitutes the CVT side exhaust pipe of the present disclosure.

The first independent exhaust pipe 54A and the fourth independent exhaust pipe 54D extend in a direction inclined upward toward the rear, and have a top portion 54*z* in a substantially central portion in the front-rear direction. The two first collecting pipes 55 are composed of an upper first collecting pipe 55A located on the upper side and a lower first collecting pipe 55B located on the lower side.

The first collecting pipe 55 is located in a manner corresponding to the rear side of a right end portion of the engine body 10, and has an upstream side end portion opening in a direction inclined to the left toward the front.

The first independent exhaust pipe 54A extends rearward from the exhaust port 14*b*, curves to the left and then curves to the right, and is connected to an upstream side end portion of the first collecting pipe 55. The second to fourth independent exhaust pipes 54B to 54D curve to the right from the exhaust port 14*b* toward the rear to reach the first collecting pipe 55. In particular, the fourth independent exhaust pipe 54D curves approximately at right angles to the opposite side to the CVT 20, that is, to the right, immediately after extending rearward from an end portion connected to the exhaust port 14*b*.

The first independent exhaust pipe 54A and the fourth independent exhaust pipe 54D are connected to an upstream side end portion of the upper first collecting pipe 55A. The second independent exhaust pipe 54B and the third independent exhaust pipe 54C are connected to an upstream side end portion of the lower first collecting pipe 55B. The second and third independent exhaust pipes 54B, 54C and the lower first collecting pipe 55B are adjacent to the right side of an upper end portion of the transmission 30.

The two first exhaust pipes 56 are composed of an upper first exhaust pipe 56A connected to a downstream side end portion of the upper first collecting pipe 55A and a lower first exhaust pipe 56B connected to a downstream side end portion of the lower first collecting pipe 55B, and are connected to an upstream side end portion of the second collecting pipe 57, respectively. Each of the two first exhaust pipes 56 extends from a downstream side end portion of the corresponding first collecting pipe 55 in a direction inclined to the right toward the rear, then curves to the left and extends to the left substantially parallel to the vehicle width direction, and is connected to an upstream side end portion of the second collecting pipe 57.

The second exhaust pipe 58 is connected to a downstream side end portion of the second collecting pipe 57. The second exhaust pipe 58 extends to the left side substantially parallel to the vehicle width direction from a downstream side end portion of the second collecting pipe 57, then curves rearward behind a left end portion of the engine body 10, and is connected to an upstream side end portion (a muffler inlet portion 52b) of the exhaust muffler 52 with a spherical joint 59 interposed between them. The exhaust gas sensor 53 is attached to an upstream side portion of the second exhaust pipe 58.

As described above, the exhaust pipe 51 curves to the right toward the rear, then extends to the rear of a right end portion of the engine body 10, curves to the left, and extends to the rear of a left end portion of the engine body 10. As a whole, the exhaust pipe 51 extends in a substantially S-shape. Of the exhaust pipe 51, a portion located on the upstream side and extending to the right toward the rear side constitutes an upstream side exhaust pipe 51a (also referred to as the front half portion) of the present disclosure, and a portion connected to a rear end portion of the upstream side exhaust pipe 51a and extending to the left side toward the rear side constitutes a downstream side exhaust pipe 51b (also referred to as the rear half portion) of the present disclosure.

That is, in the present embodiment, the upstream side exhaust pipe 51a includes a portion that extends in the direction inclined to the right side toward the rear and is located on the far right of the two first exhaust pipes 56, in addition to the four independent exhaust pipes 54 and the two first collecting pipes 55. Further, the downstream side exhaust pipe 51b includes a portion extending substantially parallel to the vehicle width direction by curving to the left toward the rear in a manner continuous with a downstream side end portion of the upstream side exhaust pipe 51a of the two first exhaust pipes 56, the second collecting pipe 57, and the second exhaust pipe 58.

The upstream side exhaust pipe 51a has, in the top view, a portion that passes through a region that is further on the right than a straight line X (see FIG. 5) extending in the front-rear direction through a right end portion of the cylinder head cover 15, and is located further on the left than a right end portion of an auxiliary case 72 (the engine auxiliary unit 70, the power transmission unit 110, and the auxiliary transmission unit 130) described later.

The exhaust muffler 52 has a cylindrical muffler main body 52a extending in the vehicle width direction, the muffler inlet portion 52b protruding forward at a left end portion, and a tail pipe 52c protruding rightward from a right end portion and curves rearward. The muffler inlet portion 52b constitutes a connection portion connected to a downstream side end portion of the exhaust pipe 51. In other words, in the exhaust system 50, the exhaust pipe 51 and the exhaust muffler 52 are disposed so as to be side by side in the front-rear direction, do not overlap in the vertical direction, and are different in position in the front-rear direction.

Here, referring to FIG. 4, the exhaust system 50 is disposed at substantially the same height as the cylinder head 14 in the vertical direction. Specifically, the exhaust pipe 51 is generally located in a region W where the cylinder head 14 is projected rearward. The region W is defined as a region in the vertical direction between the straight line W1 that passes through a lower end portion of the cylinder head 14 and extends to the rear and a straight line W2 that passes through an upper end portion of the cylinder head 14 and extends to the rear. In the vertical direction, the top portion 54z that is highest of the exhaust pipe 51 is located at substantially the same height as the straight line W2. Further, an upper end portion of the exhaust muffler 52 is located at substantially the same height as the straight line W2 in the vertical direction. Note that as indicated by a two-dot chain line in FIG. 5, the exhaust pipe 51 may be provided with a heat shielding plate 50a covering the exhaust pipe 51 from above.

As shown in FIG. 2, in the left-right direction, the engine auxiliary unit 70 (the power transmission unit 110 and the auxiliary transmission unit 130) is disposed adjacent to the side opposite to the CVT 20 of the engine body 10, that is, on the right side. FIG. 6 is a right side view illustrating an area around the engine body 10. In FIG. 6, the second collecting pipe 57 and the second exhaust pipe 58 of the exhaust pipe 51 are indicated by two-dot chain lines. As shown in FIG. 6, the engine auxiliary unit 70 has an engine auxiliary 71 and an auxiliary case 72 that accommodates the engine auxiliary 71. The auxiliary case 72 covers the engine auxiliary 71 accommodated inside from the outer side in the vehicle width direction, which prevents a foreign matter such as water or sand from directly splashing on the engine auxiliary 71.

The engine auxiliary 71 includes an alternator 71A arranged behind the engine body 10 and an air conditioner compressor 71B arranged in front of the engine body 10. The alternator 71A and the air conditioner compressor 71B have driven pulleys 73 and 74 in a right end portion. Further, inside the auxiliary case 72, a drive pulley 75 fixed to a right end portion of the crankshaft 11, a belt 76 wound over between the drive pulley 75 and the driven pulleys 73 and 74, and a tensioner 78 that adjusts the tension of the belt 76 are disposed.

Therefore, the alternator 71A and the air conditioner compressor 71B are rotationally driven as the crankshaft 11 rotates.

The auxiliary case 72 has an auxiliary case intake pipe 72a and an auxiliary case exhaust pipe 72b. The auxiliary case intake pipe 72a extends forward from a position facing a right end portion of the crankshaft 11 and opens forward. For example, the drive pulley 75 may be provided with a fin to constitute a centrifugal fan, and, as the drive pulley 75 rotates, air may be taken in from the auxiliary case intake pipe 72a to the inside of the auxiliary case 72.

The auxiliary case exhaust pipe 72b extends from an upper portion of the auxiliary case 72 in a direction inclined rearward and opens to the rear of the engine body 10. Specifically, the auxiliary case exhaust pipe 72b opens from the right side toward the independent exhaust pipe 54 of the exhaust system 50. The independent exhaust pipe 54 is effectively cooled by the air discharged from the auxiliary case exhaust pipe 72b. This also suppresses the heat transfer of temperature from the exhaust system 50 to the cargo bed 8.

Here, in the powertrain mechanism 7 according to the present embodiment, at least a part of each of the transmission 30, the air cleaner 42, the exhaust pipe 51, and the exhaust muffler 52 is disposed within a region Y (see FIGS. 1 and 2) in which the engine body 10 is projected in the front-rear direction.

As shown in FIG. 1, the region Y has an upper end portion constituted by a horizontal plane Y1 passing through an upper end portion of the cylinder head cover 15, and has a lower end portion constituted by a horizontal plane Y2 passing through a lower end portion of the crankcase 12. Further, as shown in FIG. 2, the region Y has a left end portion constituted by an extending surface Y3 that passes through a left end portion of the engine body 10 and extends in the front-rear direction, and a right end portion constituted by a vertical plane Y4 that passes through a right end portion of the engine body 10 and extends in the front-rear direction. Note that, in a case where an additional part such as an oil pan is mounted on a lower end portion of the crankcase 12, the horizontal plane Y2 is defined by a horizontal plane passing through a lower end portion of the additional part.

Hereinafter, a relationship between the exhaust pipe 51, the transmission 30, the first exhaust air E1, the second exhaust air E2, and the third exhaust air E3 will be described in detail. As illustrated in FIG. 5, the exhaust pipe 51 extends on the right side and the rear side of the transmission 30. Specifically, in the exhaust pipe 51, the first exhaust pipe is adjacent to the right side of the transmission 30 with a first space Q1 interposed between them, and the second collecting pipe 57 and the second exhaust pipe 58 are adjacent to the rear side of the transmission 30 with a second space Q2 interposed between them also with reference to FIG. 6.

The first space Q1 is defined between the exhaust pipe 51, mainly the first exhaust pipe 56 in the present embodiment, and the transmission 30. Since the first exhaust pipe 56 and the transmission 30 are adjacent to each other in the vehicle width direction, the first space Q1 is mainly defined as a space between the first exhaust pipe 56 and the transmission 30 mainly in the vehicle width direction.

The second space Q2 is defined between the transmission 30 and the exhaust pipe 51, mainly the second collecting pipe 57 and the second exhaust pipe 58 in the present embodiment. Since the second collecting pipe 57 and the second exhaust pipe 58 are adjacent to the transmission 30 in the front-rear direction, the second space Q2 is mainly defined as a space between the second collecting pipe 57 and the second exhaust pipe 58, and the transmission 30 mainly in the front-rear direction.

Since the first space Q1 and the second space Q2 are adjacent to the exhaust pipe 51, the first space Q1 and the second space Q2 are exposed to radiant heat from the exhaust pipe 51, and since the lower side and the left and right sides of the cargo bed 8 are covered by the exterior of the vehicle body 1, heat easily accumulates, and ambient temperature easily rises.

As illustrated in FIG. 4, since the exhaust pipe 51 is located further on the upper side than the transmission 30, a top opening of the first space Q1 is inclined upward toward the right side when viewed from the front-rear direction. As a result, as compared with a case where the exhaust pipe 51 and an upper end of the transmission 30 are arranged side by side in the vehicle width direction at the same height position, when the first space Q1 is viewed from the upper side of the transmission 30, specifically, when viewed in a direction inclined downward toward the right side, the top opening of the first space Q1 is ensured widely.

As illustrated in FIG. 5, a center line O2 at the discharge port 28a of the CVT exhaust duct 28 extends downward in a direction inclined rearward and rightward, and is directed to the second space Q2. As described above, the first exhaust air E1 discharged from the CVT exhaust duct 28 is inclined rearward and rightward toward the lower side. However, the first exhaust air E1 is guided at least to the second exhaust air E2 toward the rear side and the third exhaust air E3 toward the right side by the baffle plate 35.

As illustrated in FIG. 6, the first exhaust air E1 is supplied to the second space Q2 between the transmission 30 and the exhaust pipe 51. The first exhaust air E1 flows downward in a direction inclined rearward and rightward along the center line O2 of the discharge port 28a of the CVT exhaust duct 28. The first exhaust air E1 draws in surrounding air, and causes an air flow F1 on an upper rear surface of the transmission 30 in a direction inclined downward and rearward along the upper rear surface. The transmission 30 is cooled by the air flow F1 on an upper rear surface facing the second collecting pipe 57 and the second exhaust pipe 58 from the front. That is, the transmission 30 can be indirectly cooled by the first exhaust air E1 while being arranged to face the exhaust pipe 51.

The second exhaust air E2 is guided by the baffle plate 35 and is supplied to the second collecting pipe 57 and the second exhaust pipe 58 located behind the baffle plate 35 from the front side to the rear side. That is, the second collecting pipe 57 and the second exhaust pipe 58 are directly cooled by the second exhaust air E2.

The third exhaust air E3 passes over the baffle plate 35 to the right side and is supplied to the first space Q1 from the upper side to the lower side. Surrounding air is drawn by the third exhaust air E3, and an air flow F2 is generated on a right side surface of the transmission 30 toward the lower side along the right side surface. The transmission 30 is cooled on a right side surface facing the first exhaust pipe 56 from the left side by the air flow F2.

Furthermore, the electric component 37 and the drive shaft boot 9a are arranged on a right side surface of the transmission 30 in a manner that at least a part of the electric component 37 and the drive shaft boot 9a faces the first space Q1, and the electric component 37 and the drive shaft boot 9a are also cooled by the air flow F2. That is, the electric component 37 and the drive shaft boot 9a can be indirectly cooled by the third exhaust air E3 while being arranged so as to face the exhaust pipe 51. In addition to the above, a component facing the second space Q2, for example, a bushing of a suspension for the rear wheel 4 may also be cooled by the air flow F2 generated by the third exhaust air E3.

According to the vehicle 100 according to the first embodiment described above, an effect described below is achieved.

(1) The vehicle 100 includes:
the engine body 10;
the air-cooled CVT 20 to which driving force output from the engine body 10 is input;
the transmission 30 to which driving force from the engine body 10 is transmitted via the CVT 20;

the exhaust pipe 51 connected to the engine body 10 and adjacent to the transmission 30 at an interval in the horizontal direction; and the CVT exhaust duct 28 connected to the CVT 20 and including the discharge port 28*a* through which air inside the CVT 20 is discharged, the discharge port 28*a* being directed to a space between the transmission 30 and the exhaust pipe 51.

As a result, the first exhaust air E1 discharged from the CVT exhaust duct 28 is supplied to the second space Q2 between the transmission 30 and the exhaust pipe 51. Although hot air having temperature increased due to radiant heat from the exhaust pipe 51 is likely to accumulate in the second space Q2, ventilation is promoted by the first exhaust air E1 from the CVT exhaust duct 28. Furthermore, the first exhaust air E1 causes the air flow F1 in surrounding air of the first exhaust air E1, and the air flow F1 indirectly cools the transmission 30. Therefore, in a case where the transmission 30 and the exhaust pipe 51 are adjacent to each other, cooling performance of the transmission 30 is easily ensured by use of the first exhaust air E1 from the CVT exhaust duct 28.

(2) The transmission 30 is adjacent to the exhaust pipe 51, to the first exhaust pipe 56 in the present embodiment, in the vehicle width direction.

(3) The transmission 30 is adjacent to the exhaust pipe 51, to the second collecting pipe 57 and the second exhaust pipe 58 in the present embodiment, in the front-rear direction.

(4) The baffle plate 35 is attached to the transmission 30 at a position facing the lower side of the discharge port 28*a*.

As a result, the first exhaust air E1 discharged from the discharge port 28*a* is easily guided in a desired direction by the baffle plate 35. In the present embodiment, the first exhaust air E1 is guided to the second exhaust air E2 and the third exhaust air E3 by the baffle plate 35. The second exhaust air E2 is supplied to the second collecting pipe 57 and the second exhaust pipe 58 to directly cool them. The third exhaust air E3 is supplied downward in the first space Q1, and causes the air flow F2 directed downward along a right side surface of the transmission 30. The air flow F2 cools the transmission 30 on a right side surface and cools the electric component 37 and the drive shaft boot 9*a*. Therefore, the electric component 37 and the drive shaft boot 9*a* are indirectly cooled by the third exhaust air flow E3, and the baffle plate 35 can prevent entry of foreign matters such as water, sand, mud, or stones lifted up from a road surface or the like by the rear wheel 4 into the discharge port.

(5) The transmission 30 includes the electric component 37, and the electric component 37 at least partially faces the first space Q1 defined between the transmission 30 and the exhaust pipe 51.

As a result, in a case where the electric component 37 in which thermal damage due to radiant heat from the exhaust pipe 51 is likely to be a problem is attached to the transmission 30 so as to face the exhaust pipe 51, cooling performance of the electric component 37 is easily ensured, and the above effect is suitably exhibited.

(6) Since at least a part of the transmission 30, the intake pipe 41, the air cleaner 42, the exhaust pipe 51, and the exhaust muffler 52 is located in the region Y where the engine body 10 is projected in the front-rear direction, the powertrain mechanism 7 of the vehicle is compactly disposed in the vehicle width direction and the vertical direction. In this manner, the vehicle 100 is compactly configured in the vehicle width direction and the vertical direction.

(7) Since the seat 6 is located further to the front than the engine body 10, the transfer of heat generated from the engine body 10 to the seat 6 is suppressed. In this manner, the discomfort for a person seated in the seat 6 caused by the heat from the engine body 10 is suppressed.

(8) Since the vehicle 100 is a utility vehicle, the above effect is preferably exhibited. That is, it is easy to make the height of the cargo bed low while making the dimensions of the utility vehicle in the vehicle width direction compact.

(9) Since the exhaust port 14*b* is provided in a rear portion of the cylinder head 14, when the exhaust system related parts (for example, the exhaust muffler 52), which have a relatively high temperature, are disposed away from the seat 6 so as to suppress heat transfer to the seat 6 side, space occupied by a pipe (for example, the exhaust pipe 51) connecting these parts and the cylinder head 14 can be reduced. In this manner, it is easy to compactly configure the powertrain mechanism 7 in the vertical direction and the left-right direction while suppressing the discomfort for an occupant.

(10) Since the air cleaner 42 is disposed under the seat 6, the air cleaner 42 can be disposed by utilizing the dead space under the seat 6, and the intake pipe 41 that connects the cylinder head 14 and the air cleaner 42 disposed on the front side of the cylinder head 14 can be configured to be short.

(11) Since the positions of the exhaust pipe 51 and the exhaust muffler 52 are different in the front-rear direction, the exhaust muffler 52 can be easily disposed further above as compared with the case where the exhaust pipe 51 and the exhaust muffler 52 are disposed overlapping in the vertical direction. In this manner, it is easy to suppress the intrusion of water into the engine body 10 through the tail pipe 52*c* of the exhaust muffler 52, and it is easy to suppress the contact of water to the exhaust pipe 51, which affects the engine performance by being cooled. Accordingly, it is easy to improve wading performance.

(12) Since the top portion 54*z* of the exhaust pipe 51 is located at almost the same height as the horizontal plane W2 passing through an upper end portion of the cylinder head 14 in the vertical direction, it is easy to suppress the contact of the exhaust pipe 51 with water more while the powertrain mechanism 7 is compactly configured in the vertical direction.

(13) Since an upper end portion of the exhaust muffler 52 is located at substantially the same height as the horizontal plane W2 passing through an upper end portion of the cylinder head 14 in the vertical direction, it is easy to dispose the exhaust muffler 52 further above. In this manner, it is further easier to suppress water intrusion into the exhaust muffler 52 while keeping the powertrain mechanism 7 compact in the vertical direction.

(14) Since a front end upper portion of the transmission 30 is adjacent to the left side of the upstream side exhaust pipe 51*a* (front half portion) of the exhaust pipe 51, the transmission 30 can be easily configured to be long in the vertical direction while interference with the exhaust pipe 51 is prevented. In this manner, the transmission 30 can be compactly configured in the front-rear direction.

(15) Since the fourth independent exhaust pipe 54D (that is, the CVT side exhaust pipe) curves to the opposite side (right side) to the CVT 20 immediately after the exhaust port 14*b*, it is easy to configure the exhaust pipe 51 in a manner that interference with the transmission 30 is suppressed. Further, as compared with the case where the exhaust pipe 51 is curved toward the CVT 20 side, it is easy to lengthen the exhaust pipe 51 and improve the engine performance.

(16) Since an upper portion of the transmission 30 is inclined downward toward the rear, it is easier to further configure the exhaust pipe 51 so as to suppress interference with the transmission 30.

(17) Since the CVT exhaust duct 28 is located above the transmission 30 and below an upper end portion of the CVT housing 21, it is easy to compactly arrange the CVT exhaust duct 28 above the transmission 30. In this manner, rising of the height position of the cargo bed 8 is suppressed while the CVT exhaust duct 28 is provided.

(18) Since the engine auxiliary 71 is covered from the vehicle width direction by the auxiliary case 72, the engine auxiliary 71 can be protected from a foreign matter such as water and sand. In particular, the above effect is preferably exhibited in a case where a vehicle travels on a submerged road, an uneven terrain road, and the like.

(19) Since the auxiliary case 72 is provided with the auxiliary case intake pipe 72*a* and the auxiliary case exhaust pipe 72*b*, the engine auxiliary 71 accommodated in the auxiliary case 72 is effectively cooled.

(20) Since the air cleaner 42 is disposed so as to have the upper end located below the horizontal plane W2 passing through an upper end portion of the cylinder head 14, an increase in the dimension in the vertical direction of the powertrain mechanism 7 can be suppressed and the powertrain mechanism 7 can be easily accommodated in a limited space.

(21) Since the air cleaner 42 is disposed on the front side of the engine body 10 so as to extend over from the engine body 10 to the CVT 20 (the power transmission unit 110 and the driving force transmission unit 120) in the vehicle width direction, it is easy to increase the capacity of the air cleaner 42. Further, since the air cleaner 42 is located on the inner side (further right) in the vehicle width direction than a left end portion of the CVT 20, it is easy to compactly configure the powertrain mechanism 7 as a whole in the vehicle width direction. Therefore, it is easy to secure the mountability of the powertrain mechanism 7 on the vehicle 100 while configuring the air cleaner 42 to be large in the vehicle width direction.

(22) The air cleaner 42 is arranged on the front side with respect to the engine body 10 with a space between them, and is arranged directly under the driver's seat 6A. In this manner, it is easy to suppress heat transfer from the engine body 10 to the air cleaner 42. Further, it is easy to access the air cleaner 42 from seat 6 and maintainability is excellent. Further, since the air cleaner 42 is disposed directly under the driver's seat 6A, the space below the passenger seat 6B can be configured as, for example, a storage space.

(23) Since the exhaust pipe 51 passes through a region on the outer side (further right) in the vehicle width direction than the cylinder head cover 15, it is easy to lengthen the exhaust pipe 51. Further, since the exhaust pipe 51 extends inward (further left) in the vehicle width direction than an outer end portion (right end portion) in the vehicle width direction of the auxiliary transmission unit 130 (the auxiliary case 72, the engine auxiliary unit 70, and the drive transmission unit 110), it is easy to compactly configure the powertrain mechanism 7 as a whole in the vehicle width direction. That is, deterioration in the mountability of the powertrain mechanism 7 on the vehicle 100 can be suppressed while the exhaust length is lengthened.

(24) The exhaust muffler 52 is connected to a downstream portion of the exhaust pipe 51, and the exhaust muffler 52 has the muffler inlet portion 52*b* (connection portion) connected to the exhaust pipe 51 on the front surface and in a left end portion. In this manner, the exhaust pipe 51 can be extended in an S-shape, and the length of the exhaust pipe can be easily increased. Further, the exhaust muffler 52 and the exhaust pipe 51 can be easily disposed in the front-rear direction, and the exhaust muffler 52 can be easily disposed so that the upper end is located above the lower end of the exhaust pipe 51. Furthermore, since the exhaust muffler 52 can be disposed behind the exhaust pipe 51, the influence of the temperature due to the exhaust muffler 52 with respect to the engine body 10 and other units is suppressed.

In the above embodiment, the case where the air box 46 is interposed between the throttle body 45 and the air cleaner 42 is described as an example. However, the air box 46 is not necessarily needed. That is, the throttle body 45 and the air cleaner 42 may be configured to be directly connected by an air pipe.

Further, in the above embodiment, the case where the exhaust pipe 51 and the exhaust muffler 52 are directly connected is described as an example. However, another exhaust pipe may be interposed between the exhaust pipe 51 and the exhaust muffler 52, so that the exhaust pipe 51 and the exhaust muffler 52 are configured to be indirectly connected.

Second Embodiment

A vehicle 200 according to a second embodiment of the present disclosure will be described with reference to FIGS. 7 to 9. The vehicle 200 includes a CVT exhaust duct 228, a transmission 230, and an exhaust system 250 different from those of the first embodiment. The same reference numerals are used for members common to or corresponding to those of the first embodiment, and detailed description of such members will be omitted.

Figure 7:
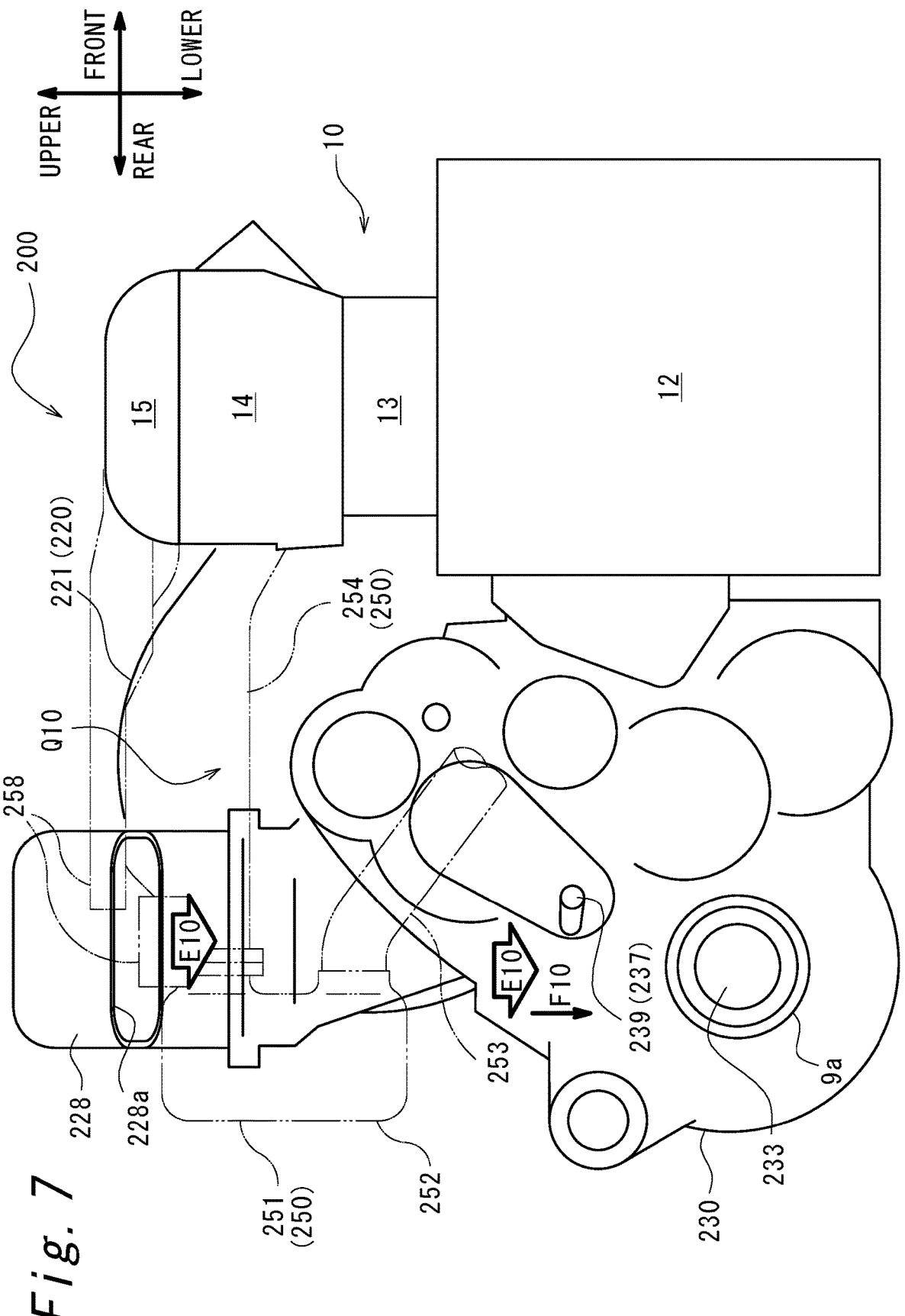
FIG. 7 is a right side view around an exhaust system and a transmission of a vehicle according to a second embodiment of the present disclosure.

FIG. 7 is a right side view around the exhaust system 250 and the transmission 230. In FIG. 7, the exhaust system 250 is indicated by a two-dot chain line. FIG. 8 is a top view around the exhaust system 250 and the transmission 230. FIG. 9 is a rear view around the exhaust system 250 and the transmission 230. As illustrated in FIG. 7, the exhaust system 250 includes an exhaust manifold 254 connected to the engine body 10 and an exhaust pipe 251 connected to the downstream side of the exhaust manifold 254.

Figure 8:
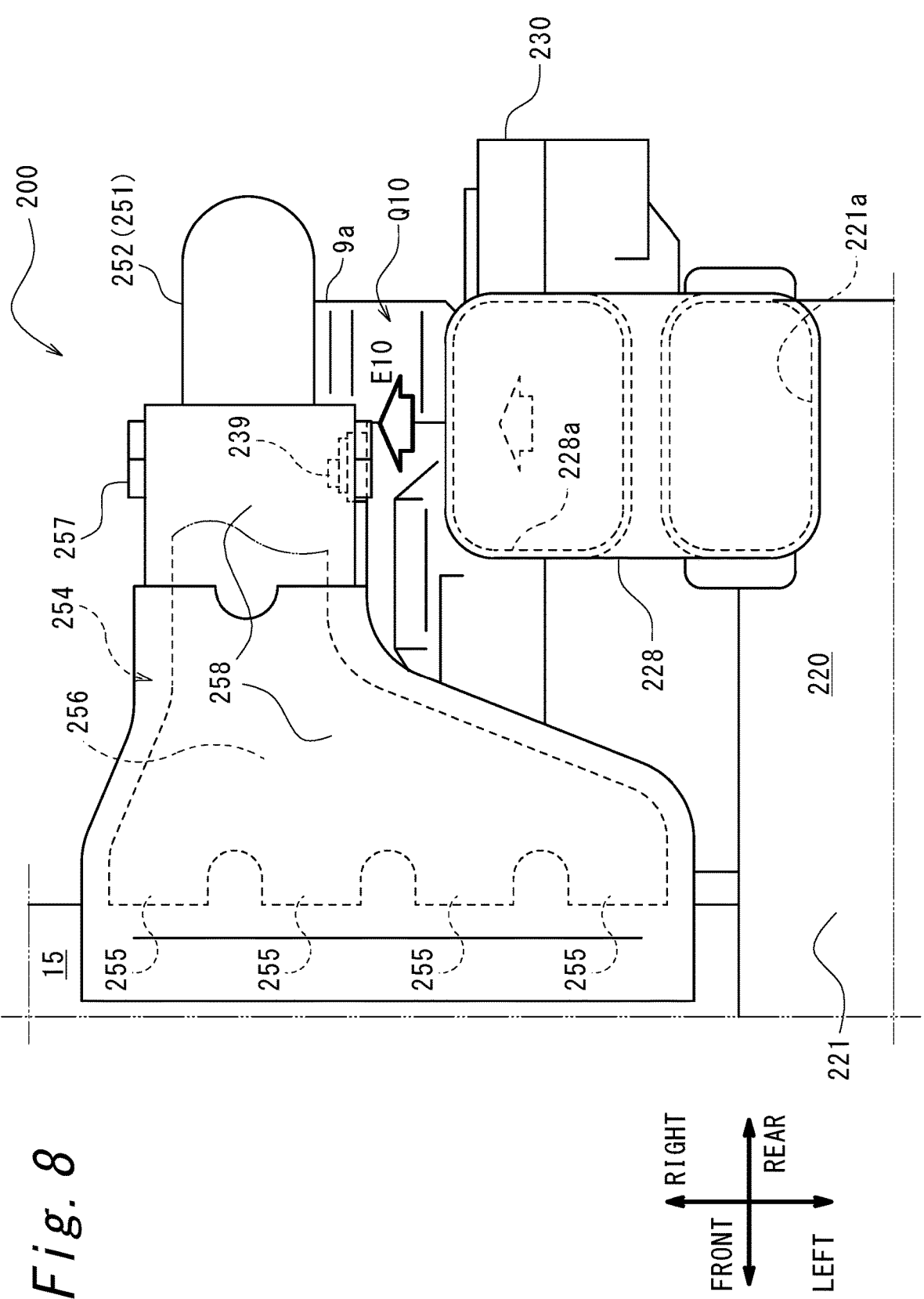
FIG. 8 is a top view around the exhaust system and the transmission of FIG. 7.

As illustrated in FIG. 8, the exhaust manifold 254 includes a plurality, four in the present embodiment, of independent exhaust pipes 255, a manifold collection portion 256 in which a plurality of the independent exhaust pipes 255 are collected, and an outlet flange 257 provided at an outlet of a downstream side end portion of the manifold collection portion 256. In the exhaust manifold 254, the outlet flange 257 is located in a manner biased to the side opposite to the transmission 230, that is, the right side. A heat shielding plate 258 covering from above is attached to the exhaust manifold 254.

As illustrated in FIG. 7, the exhaust pipe 251 is attached to the outlet flange 257 of the exhaust manifold 254, and has a U-turn portion 252 curved downward by 180 degrees and a first exhaust pipe 253 attached to the U-turn portion 252 and extending forward. Referring also to FIG. 9, the exhaust manifold 254 and the U-turn portion 252 are located further on the upper side than the transmission 230.

The transmission 230 is configured in substantially the same manner as the transmission 30 according to the first embodiment, but is different from the transmission 30 in that the baffle plate 35 and the differential lock solenoid valve 38 are not provided. The transmission 230 includes a rotation sensor 239 as an electric component 237 on a right side surface. The drive shaft boot 9*a* of the drive shaft 9 for driving the rear wheel 4 is attached to a gear shift output shaft 233 of the transmission 230.

As illustrated in FIG. 8, a first space Q10 is defined between the transmission 230, the exhaust manifold 254, and the exhaust pipe 251. The first space Q10 is located below the cargo bed 8, further on the right side than the transmission 230 and further on the left side and further on the lower side than the exhaust manifold 254 and the exhaust pipe 251 in a top view illustrated in FIG. 8, and is defined as a space that is elongated substantially in the front-rear direction. At least a part of the rotation sensor 239 faces the first space Q10.

The CVT exhaust duct 228 is connected to a CVT exhaust port 221a provided at an upper portion of a rear end of a CVT housing 221 constituting an outer shell of a CVT 220. The CVT exhaust port 221a is elongated in the front-rear direction in top view and is open upward.

Figure 9:
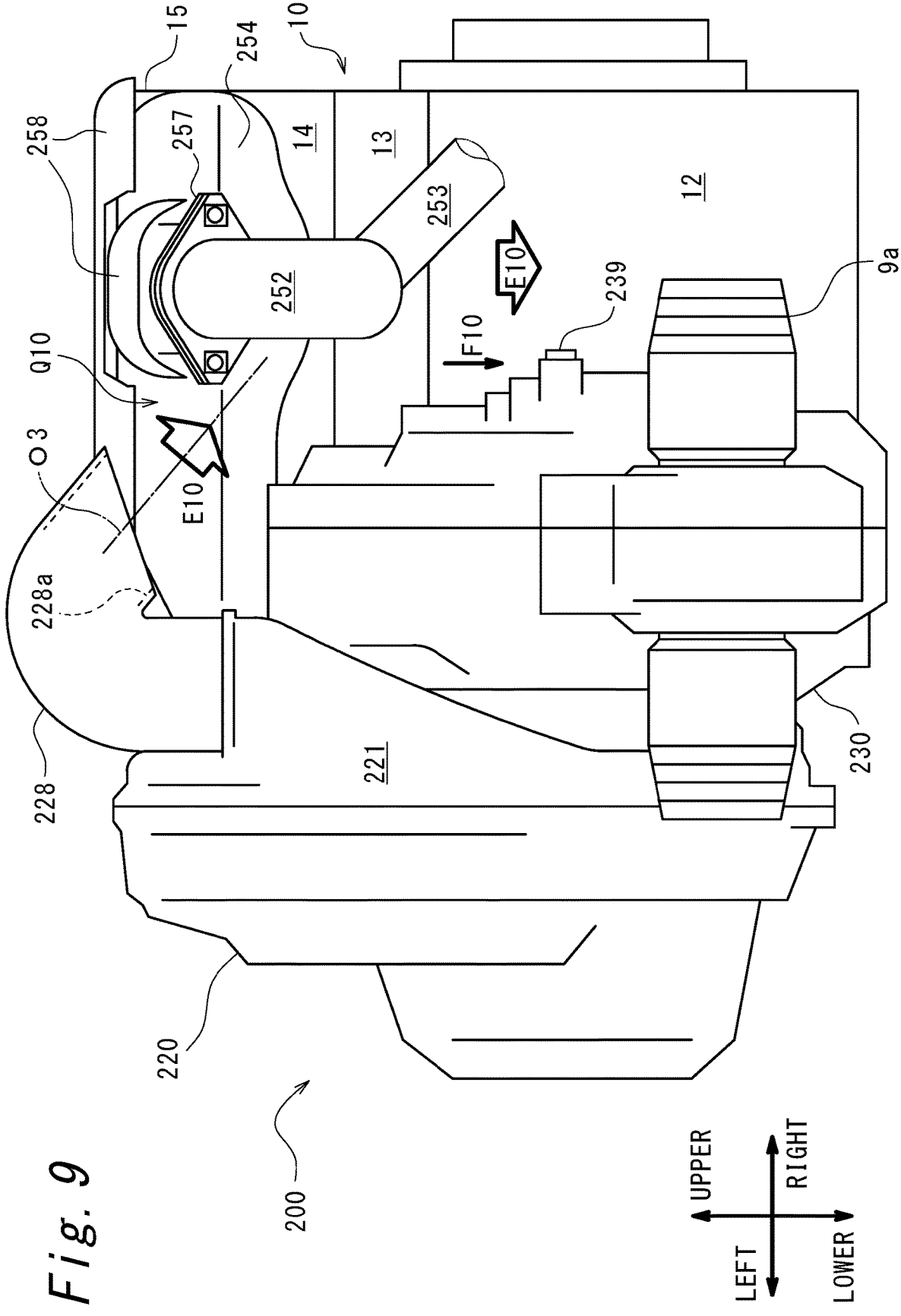
FIG. 9 is a rear view around the exhaust system and the transmission of FIG. 7.

As illustrated in FIG. 9, the CVT exhaust duct 228 extends upward and is curved to the right side, and a discharge port 228a extends in a direction inclined downward toward the right side. In the rear view illustrated in FIG. 9, an outlet end surface of the discharge port 228a is inclined with respect to a center line O3 of the discharge port 228a. Specifically, the outlet end surface of the discharge port 228a is inclined upward from the transmission 230 toward the exhaust manifold 254.

That is, as compared with a case where an outlet end surface of the discharge port 228a is orthogonal to the center line O3, the outlet end surface is easily extended toward the exhaust manifold 254 and the exhaust pipe 251, and exhaust air from the discharge port 228a is efficiently supplied to the first space Q10.

As illustrated in FIG. 8, the discharge port 228a is elongated in the front-rear direction along the first space Q10 elongated in the front-rear direction. The discharge port 228a is located on the upper side on the left side with respect to the outlet flange 257 of the exhaust manifold 254 and the U-turn portion 252 of the exhaust pipe 251. Therefore, as illustrated in FIG. 9, exhaust air E10 discharged from the CVT exhaust duct 228 is supplied from the upper side on the left side with respect to the first space Q10. In the first space Q10, air located around the exhaust air E10 is drawn into the exhaust air E10, and an air flow F10 flowing downward along a right side surface of the transmission 230 is generated.

By the air flow F10, the transmission 230 is cooled on a right side surface, and the rotation sensor 239 provided on the right side surface is also cooled. Therefore, the transmission 230 and the rotation sensor 239 are indirectly cooled by the exhaust air E10 discharged from the CVT exhaust duct 28. Furthermore, the drive shaft boot 9a connected to the transmission 230 is also indirectly cooled by the exhaust air E10 discharged from the CVT exhaust duct 28.

That is, according to the vehicle 200 according to the second embodiment, the same function and effect as those of the vehicle 100 according to the first embodiment are produced, and a function and an effect described below are additionally produced.

(1) The discharge port 228a of the CVT exhaust duct 228 is located above the transmission 230 and extends in a direction inclined with respect to the horizontal direction.

As a result, since the exhaust air E10 from the CVT exhaust duct 228 can be supplied from obliquely above toward the first space Q10, it is not necessary to extend the CVT exhaust duct 228 to directly above the first space Q10, and the discharge port 228a can be configured to be located on the near side, that is, on the side above the transmission 230. As a result, the CVT exhaust duct 228 is prevented from becoming long.

(2) The exhaust manifold 254 and the U-turn portion 252 of the exhaust pipe 251 are located further on the upper side than the transmission 230.

As a result, when viewed from a direction along the center line O3 of the discharge port 228a of the CVT exhaust duct 228, a top opening of the first space Q10 is easily ensured widely, so that the exhaust air E10 can be effectively supplied to the first space Q10, and cooling performance of the first space Q10 is easily further improved.

(3) The discharge port 228a of the CVT exhaust duct 228 is elongated in a direction in which the first space Q10 extends, that is, in the front-rear direction.

As a result, since a shape of the discharge port 228a easily follows the first space Q10, it is easy to widely supply the exhaust air E10 discharged from the CVT exhaust duct 228 to the first space Q10 via the discharge port 228a.

In the second embodiment, the discharge port 228a of the CVT exhaust duct 228 is located above the transmission 230. However, the discharge port 228a may be opened above the first space Q10. In this case, the exhaust air E10 may be configured to be supplied to the first space Q10 from directly above to below.

Note that the vehicle according to the present disclosure is not limited to the configuration of the above embodiment, and various modifications can be made.

What is claimed is:

1. A vehicle comprising:
   an engine;
   an air-cooled CVT to which driving force output from the engine is input;
   a transmission to which the driving force from the engine is transmitted via the CVT;
   an exhaust pipe connected to the engine and adjacent to the transmission at an interval in a horizontal direction; and
   a CVT exhaust duct connected to the CVT and including a discharge port through which air inside the CVT is discharged, the discharge port being directed to a space between the transmission and the exhaust pipe.

2. The vehicle according to claim 1, wherein the transmission is adjacent to the exhaust pipe in a vehicle width direction.

3. The vehicle according to claim 1, wherein the transmission is adjacent to the exhaust pipe in a front-rear direction.

4. The vehicle according to claim 1, wherein the discharge port is located above the transmission and extends in a direction inclined with respect to the horizontal direction.

5. The vehicle according to claim 4, wherein an upper end portion of the exhaust pipe is located further on an upper side than the transmission.

6. The vehicle according to claim 1, wherein the discharge port is elongated in a direction in which a space defined between the transmission and the exhaust pipe extends.

7. The vehicle according to claim 6, wherein the transmission is adjacent to the exhaust pipe in the vehicle width direction, and the discharge port is elongated in a front-rear direction.

8. The vehicle according to claim 1, wherein a plate is attached to the transmission at a position facing a lower side of the discharge port.

9. The vehicle according to claim 1, wherein the transmission includes an electric component, and the electric component at least partially faces a space
defined between the transmission and the exhaust pipe.

\* \* \* \* \*